US006879813B2

(12) United States Patent
Reznik

(10) Patent No.: US 6,879,813 B2
(45) Date of Patent: Apr. 12, 2005

(54) LINK-QUALITY ESTIMATION METHOD AND COMPONENTS FOR MULTI-USER WIRELESS COMMUNICATION SYSTEMS

(75) Inventor: Alexander Reznik, Princeton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/747,734

(22) Filed: Dec. 29, 2003

(65) Prior Publication Data

US 2004/0152423 A1 Aug. 5, 2004

Related U.S. Application Data

(60) Provisional application No. 60/444,244, filed on Jan. 30, 2003.

(51) Int. Cl.$^7$ .............................................. H04B 17/00
(52) U.S. Cl. ................................ 455/67.11; 455/67.13; 455/69; 455/522; 455/70; 455/296; 455/226.1; 455/226.2; 455/226.3; 455/234.2; 455/562.1; 455/101; 370/318; 370/320; 370/332; 370/333; 370/334; 370/335; 370/441
(58) Field of Search .......................... 465/67.11, 67.13, 465/69, 522, 70, 296, 226.1, 226.2, 226.3, 234.2, 562.1, 101; 370/318, 320

(56) References Cited

U.S. PATENT DOCUMENTS

| | | | | |
|---|---|---|---|---|
| 5,528,593 A | * | 6/1996 | English et al. | ............... 370/391 |
| 5,621,723 A | * | 4/1997 | Walton, Jr. et al. | .......... 370/335 |
| 5,722,051 A | * | 2/1998 | Agrawal et al. | ............... 455/69 |
| 5,812,593 A | * | 9/1998 | Kaku | .......................... 370/391 |
| 6,067,458 A | * | 5/2000 | Chen | ........................... 455/522 |
| 6,144,861 A | * | 11/2000 | Sundelin et al. | ............. 455/522 |
| 6,493,541 B1 | * | 12/2002 | Gunnarsson et al. | ........... 455/69 |
| 6,816,541 B1 | * | 11/2004 | Schmidl | ..................... 375/148 |
| 6,823,194 B1 | * | 11/2004 | Haim | ......................... 455/522 |

FOREIGN PATENT DOCUMENTS

WO 02/09311 A2 1/2002

OTHER PUBLICATIONS

3G TS 25.222 v3.2.0 (Mar. 2000), 3$^{rd}$ Generation Partnership Project; Technical Specification Group Radio Access Network; Multiplexing and channel coding (TDD) (Release 1999).

(Continued)

*Primary Examiner*—Marceau Milord
(74) *Attorney, Agent, or Firm*—Volpe and Koenig, P.C.

(57) ABSTRACT

Received signal characteristics of multiple concurrently received channels are determined using an analytical approach for computation in lieu of the measurement based approach of the prior art. A receiving wireless transmit receive unit (WTRU) and method are provided for processing concurrent communication signals from a plurality of transmitting WTRUs that concurrently transmit successive data blocks in a plurality of K forward channels. The receiving WTRU preferably has a receiver configured to receive successive data blocks of K concurrent transmissions transmitted from the transmitting WTRUs on the respective K forward channels. A processor is configured to compute individual channel characteristics for each forward channel k based on the characteristics of data signals received on all K forward channel. The processor is preferably configured to successively compute instantaneous Signal to Interference Ratio values for each forward channel j (iSIRj), for integers j=1 to K, based on a cross correlation matrix of channel response characteristics of K concurrently received data blocks and to selectively compute an average value that is used for the computing the individual channel characteristics for the forward channel k. The individual channel characteristics are advantageously used for power control or for the processing of the data blocks received on the respective forward channels.

21 Claims, 4 Drawing Sheets

OTHER PUBLICATIONS

3G TS 25.223 v3.3.0 (Jun. 2000), $3^{rd}$ Generation Partnership Project; Technical Specification Group Radio Access Network; Spreading and modulation (TDD) (Release 1999).

3GPP TS 25.224 v3.6.0 (Mar. 2001), $3^{rd}$ Generation Partnership Project; Technical Specification Group Radio Access Network; Physical Layer Procedures (TDD) (Release 1999).

Poor et al., "Probability of Error in MMSE Multiuser Detection," IEEE Transactions on Information Theory, vol. 43, No. 3, May 1999, pp. 858–871.

"Specifications of Air–Interface for 3G Mobile System," Association of Radio Industries and Businesses (ARIB), Version 1.0, 1999.

* cited by examiner

LINK-QUALITY ESTIMATION METHOD AND COMPONENTS FOR MULTI-USER WIRELESS COMMUNICATION SYSTEMS

CROSS REFERENCE TO RELATED APPLICATION(S)

This application claims priority from U.S. provisional application No. 60/444,244 filed on Jan. 30, 2003, which is incorporated by reference as if fully set forth.

FIELD OF INVENTION

This invention relates generally to link-quality estimation method and components for wireless communication systems, and has particular applicability to link-quality estimation within multi-user receivers of such systems.

BACKGROUND

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs are connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services also receives and administers connection requests from subscribers from external networks.

The RNCs generally control internal functions of the UTRAN. The RNCs also provides intermediary services for communications having a local component via a Uu interface connection with a Node B and an external service component via a connection between the CN and an external system, for example overseas calls made from a cell phone in a domestic UMTS.

Typically a RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

In a typical cellular communication system, such as UMTS time division duplex (TDD), UMTS frequency division duplex (FDD), each transmitter-receiver link is required to maintain a certain quality-of-service (QoS) level, typically measured in either signal-to-interference ratio (SIR), bit error rate (BER), or block error rate (BLER). Because such systems are generally interference limited, it is desirable for the transmitters to expand the minimal amount of power necessary to maintain the specified link quality.

Various methods of power control for wireless communication systems are well known in the art. An examples of a closed loop power control transmitter system for a wireless communication system is illustrated in FIG. 2. The purpose of such systems is to rapidly vary transmitter power in the presence of a fading propagation channel and time-varying interference to minimize transmitter power while insuring that data is received at the remote end with acceptable quality.

In communication systems such as Third Generation Partnership Project (3GPP) Time Division Duplex (TDD)

and Frequency Division Duplex (FDD) systems, multiple shared and dedicated channels of variable rate data are combined for transmission. Background specification data for such systems are found at 3GPP TS 25.223 v3.3.0, 3GPP TS 25.222 v3.2.0, 3GPP TS 25.224 v3.6 and Volume 3 specifications of Air-Interface for 3G Multiple System Version 1.0, Revision 1.0 by the Association of Radio Industries Businesses (ARIB). A fast method and system of power control adaptation for data rate changes resulting in more optimal performance is taught in International Publication Number WO 02/09311 A2, published 31 Jan. 2002 and corresponding U.S. patent application Ser. No. 09/904,001, filed Jul. 12, 2001 owned by the assignee of the present invention.

Generally in loop power control between a transmitter and a receiver, the receiver estimates the quality of the link and reports back to the transmitter using a different link to either increase its transmit power if the link quality is not met or decrease it if the link quality is higher than desired. Because wireless channels are variable, the link quality monitoring is a continual operation where the behavior of the transmitters is continually adapted to the channel conditions.

Link monitoring must be performed both on the forward and the reverse links of a cellular system. In addition to the closed-loop "power-control" task described above, link QoS information may be necessary for other operations, such as in-sync/out-of-sync detection, radio resource management, etc. Accordingly, the link quality operation is very important to the proper performance of most cellular communication systems; however, obtaining an accurate measurement of link quality is a non-trivial task.

The BLER value is a typical desired measurement of the link quality, but accurate estimation of this quantity based on the actual error rates in the received data is not feasible in many cases because of the length of time needed to determine an accurate value. The decoded (post-channel-decoder) BER is often used as a substitute, but in fading channel conditions, there is a reduced relationship between BLER and the BER. A further consideration is that this BER may also take a significant amount of time to compute.

The signal-to-interference ratio (SIR) has often been used in classical (RAKE-receiver) CDMA systems as a QoS estimate because of the ease with which it can be rapidly estimated from the received signal. In systems using linear multi-user detectors, the method for SIR computations that were used in classical CDMA are no longer valid, and methods directed at QoS measurements in such systems are not well understood.

SUMMARY

In accordance with the present invention, received signal characteristics of multiple concurrently received channels are determined using an analytical approach for computation in lieu of the measurement based approach of the prior art. In one aspect of the invention, a receiving wireless transmit receive unit (WTRU) is provided for processing concurrent communication signals from a plurality of transmitting WTRUs that concurrently transmit successive data blocks in a plurality of K forward channels.

The receiving WTRU preferably has a receiver configured to receive successive data blocks of K concurrent transmissions transmitted from the transmitting WTRUs on the respective K forward channels. A processor is configured to compute individual channel characteristics for each forward channel k based on the characteristics of data signals received on all K forward channel. The processor is preferably configured to successively compute instantaneous Signal to Interference Ratio values for each forward channel j (iSIRj), for integers j=1 to K, based on a cross correlation matrix of channel response characteristics of K concurrently received data blocks and to selectively compute an average value that is used for the computing the individual channel characteristics for the forward channel k.

The individual channel characteristics are advantageously used for power control or for the processing of the data blocks received on the respective forward channels. For example with respect to power control, the transmitting WTRUs can be configured to make forward channel power adjustments as a function of characteristics of the data signals as received over the respective forward channel in which closed loop transmission power control for the forward channel k is implemented. The receiving WTRU is then preferably configured to compute transmit power control signals by producing power step commands as a function of computed Target Signal to Interference Ratios for the forward channel k (Target SIRks) in comparison to a signal characteristic SIRk value. To do this the processor is configured to compute the signal characteristic SIRk values as a selectively defined average value of iSIRj values. Also, each Target SIR can be determined as a function of a Block Error Rate estimate for the respective forward channel k (BLERk estimate), so that the processor is preferably configured to compute the BLERk estimate as a selectively defined average value of iSIRj values. The receiving WTRU then preferably also includes a transmitter configured to transmit on a reverse channel the transmit power control signals for forward channel power adjustments of forward channel k.

Preferably, the average value that is used for the computing the individual channel characteristics for each forward channel k is computed by computing an expected instantaneous raw Bit Error Rate (BER) for the channel k (EIRBk) as a function of iSIRk and then computing an average of selected EIRBk values to define a raw Bit Error Rate for the channel k (raw BERk).

Other objects and advantages will be apparent to those of ordinary skill in the art based upon the following description of presently preferred embodiments of the invention.

BRIEF DESCRIPTION OF THE DRAWING(S)

TABLE OF ACRONYMS

| | |
|---|---|
| 2G | second generation mobile radio system standard |
| 2.5G | revised second generation mobile radio system standard |
| 3GPP | third generation partnership project |
| ARIB | association of radio industries businesses |
| ASIC | application specific integrated circuit |
| BER | bit error rate |
| BLER | block error rate |
| CN | core network |
| CRB | critical raw BER |
| DSP | digital signal processor |
| EIRB | expected instantaneous raw BER |
| ETSI SMG | European telecommunications standard institute — special mobile group |
| FDD | frequency division duplex |
| GPRS | general packet radio service |
| GSM | global system for mobile telecommunications |
| $I_{or}/I_{oc}$ ratio | Owncell-to-Othercell Interference Power Ratio |
| iSIR | instantaneous SIR |
| MUD | multi-user detector |
| PSTN | public switched telephone network |
| QoS | quality-of-service |
| R5 | release 5 |
| RNCs | radio network controllers |
| RRC | radio resource control |
| SIR | signal to interference ratio |
| TDD | time-division duplex |
| TS | time slot |
| UMTS | universal mobile telecommunication system |
| UTRA TDD | UMTS terrestrial radio access time division duplex |
| UTRAN | UMTS terrestrial radio access network |
| WCDMA | wideband code division multiple access |
| WTRUs | wireless transmit receive units |

DETAILED DESCRIPTION OF THE PREFERRED EMBODIMENT(S)

The present invention is directed to wireless communication systems and the processing of received communications signals to facilitate the transmission and reception of such signals with a desired Quality of Service (QoS) without undue interference to other wireless communications or unnecessary power consumption. Wireless communication systems, such as, for example, a cellular telecommunications system can include one or more base stations or Node Bs, and a plurality of wireless transmit/receive units (WTRUs). A wireless transmit/receive unit ("WTRU") includes but is not limited to a user equipment, mobile station, fixed or mobile subscriber unit, pager, or any other type of device capable of operating in a wireless environment. These exemplary types of wireless environments include, but are not limited to, wireless local area networks and public land mobile networks. A "base station" is a type of WTRU and includes, but is not limited to, a base station, Node B, site controller, access point or other interfacing device in a wireless environment.

In general, Quality of Service (QoS) for wireless communications is directly related to having the wireless signals transmitted with sufficient power. However, it is desirable to limit transmission power as much as possible to avoid undue interference to other wireless communications and unnecessary power consumption. Conventional power control methods for wireless systems such as 3GPP evaluate QoS metrics to balance the competing desires to maintain signal quality without at a minimum power level.

Figure 1:
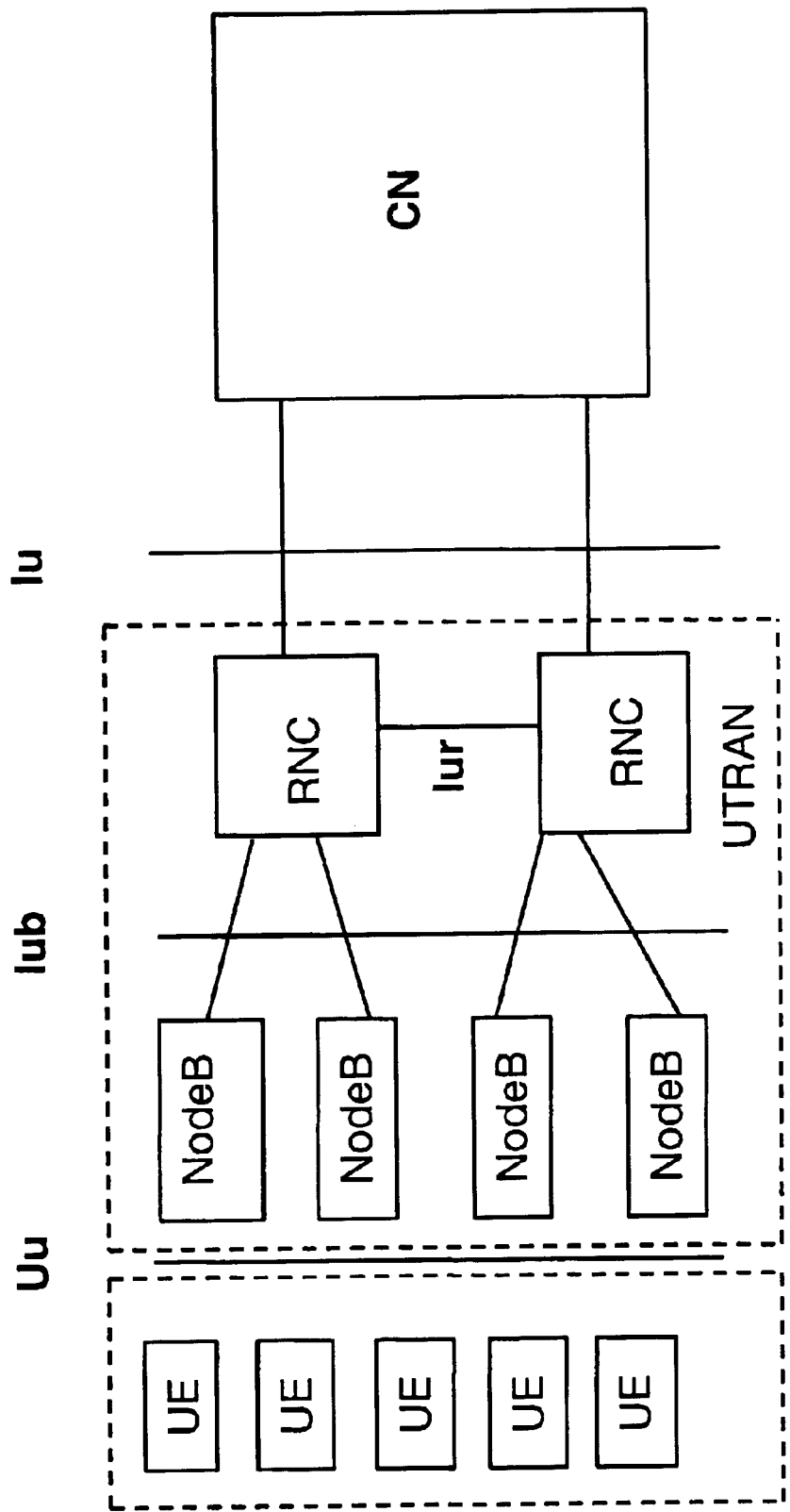
FIG. 1 shows an overview of a system architecture of a conventional UMTS network.
Figure 2:
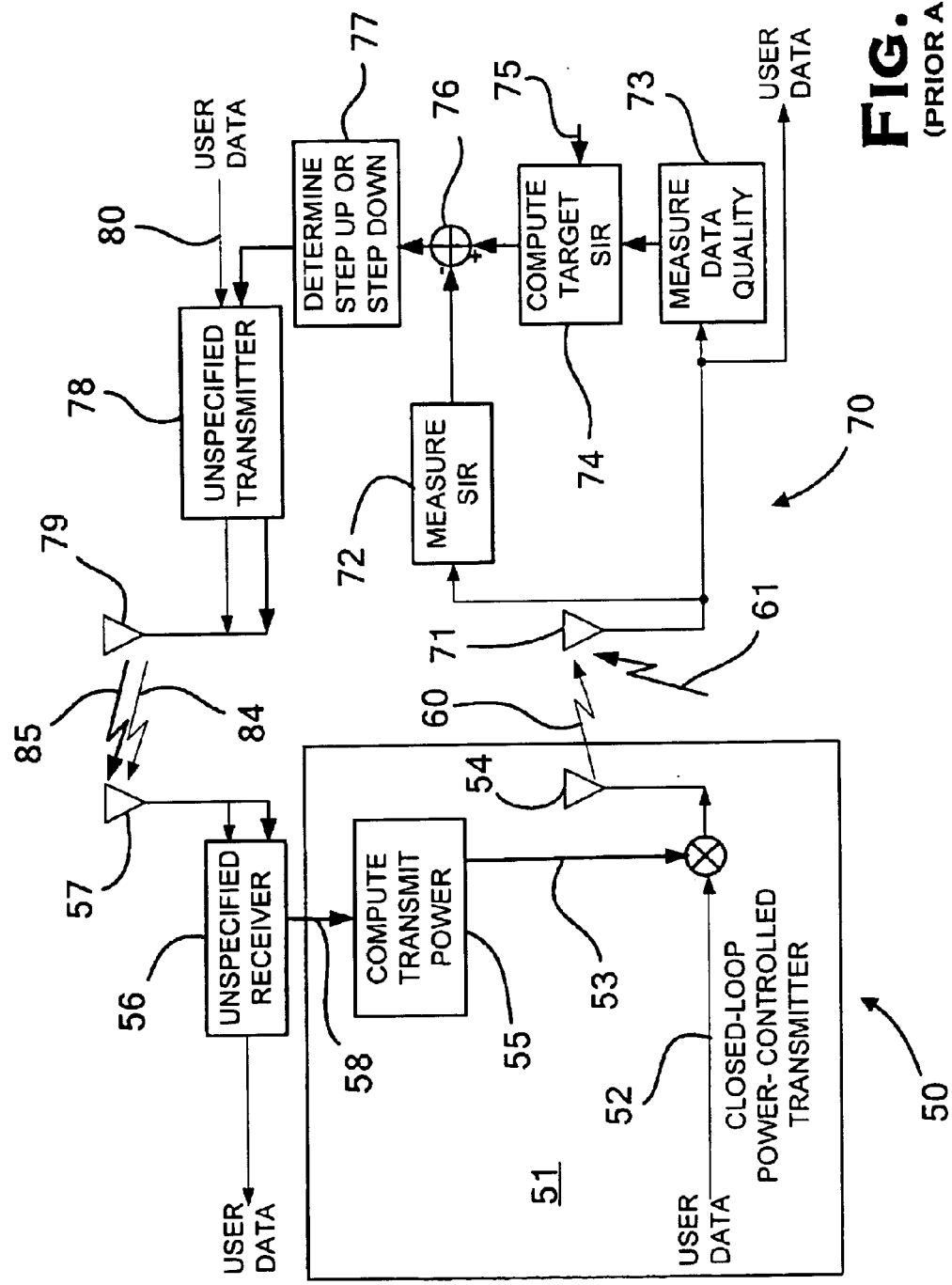
FIG. 2 is a schematic diagram of a conventional closed loop power control system for a wireless communication system.

With reference to FIG. 2, a wireless communication system having a transmitting station 50 and a receiving station 70 which employs a closed loop power control system is illustrated. The transmitting station 50 includes a transmitter 51 having a data line 52 which transports a user data signal for transmission. The user data signal is provided with a desired power level which is adjusted by applying a transmit power adjustment from an output 53 of a processor 55 to adjust the power level. The user data is transmitted via an antenna system 54 of the transmitter 51.

A wireless radio signal 60 containing the transmitted data is received by the receiving station 70 via a receiving antenna system 71. The receiving antenna system will also receive interfering radio signals 61 which impact on the quality of the received data. The receiving station 70 includes an interference power measuring device 72 to which the received signal is input which device 72 outputs measured Signal to Interference Ratio (SIR) data. The receiving station 70 also includes a data quality measuring device 73 into which the received signal is also input which device 73 produces a data quality signal. The data quality measuring device 73 is coupled with a processor 74 which receives the signal quality data and computes target signal to interference ratio (SIR) data based upon a user defined quality standard parameter received through an input 75.

A combiner 76, preferably a substracter, compares the measured SIR data from the device 72 with the computed target SIR data from the processor 74, preferably by subtracting, to output an SIR error signal. The SIR error signal from the combiner 76 is input to processing circuitry 77 which generates step up/down commands based thereon.

The receiving station 70 also includes a transmitter 78 which is coupled with the processing circuitry 77. The receiving station's transmitter 78 also includes an input 80 for user data. The receiving station 70 transmits its user data and the control related data via an associate antenna system 79.

The transmitting station 50 includes a receiver 56 and an associated receiving antenna system 57. The transmitting station's receiver 56 receives the radio signal transmitted from the receiving station 70 which includes the receiving station's user data 84 and the control data 85 generated by the receiving station.

The transmitting station's transmitter's processor 55 has an input 58 associated with the transmitting station's receiver 51. The processor 55 receives the up/down command signal through input 58 and computes the transmit power adjustments based thereon.

With respect to the so-called inner loop of the closed loop power control system, the transmitting station's transmitter 51 sets its power based upon high-rate "step-up" and "step-down" commands generated by the remote receiving station 70. At the remote receiving station 70, the SIR of the received data is measured by the measuring device 72 and compared with a target SIR value generated by the processor 74 via combiner 76. The target SIR is that value (in theory) which, given that the data is received with that value, results in a desired quality of service. If the measured received SIR is less than the target SIR, a "step-down" command is issued by the processing circuitry 77, via the receiving station's transmitter 78 and the transmitting station's receiver 56, to the transmitter 51, otherwise a "step-up" command is issued. The power control system is considered "closed-loop" because of the high-rate feedback of the "step-up" and "step-down" commands which can react in real time to the time-varying propagation channel and interference. If required transmit power level changes due to time varying interference and propagation, it quickly responds and adjusts transmit power accordingly.

With respect to the so-called outer loop of the closed loop power control system, the quality of the received data is evaluated in the receiving station 70 by the measuring device 73. Typical metrics for digital data quality are bit error rate and block error rate. Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed and compared with the desired metric (representing a desired quality of service) by the processor 74 and an updated target SIR is then output. The updated target SIR is that value (in theory) which applied in the receiver algorithm would cause the measured metric to converge to the desired value. The updated target SIR is then used in the inner loop to determine the direction of the step up/down commands sent to the transmitting station's power scale generating processor 55 to control the power of the transmitter 51.

Outer-loop functionality for the transmitting station 10, 50 relies on observations of received transmissions by the receiving station 30, 70 such as observing block-error rates (BLER) or received SIRs. If for example the BLER becomes higher than allowed, such as BLER>0.1 in 3GPP R5, and the user data becomes unusable because of too many errors, a higher target SIR is computed that causes the transmitting station 10, 50 in turn to adjust its transmit power. However, the in some cases it is difficult to observe WTRU specific BLER or measured SIR with a frequency to assure consistent outer loop power control.

According to the present invention a new process for link-quality estimation and measurement is provided for wireless communications receivers that concurrently receive and process multiple communication signals. The invention has been found to have particular applicability for receivers that utilize linear multi-user detectors where communications are subject to fading conditions such as where mobile WTRUs are communicating while in transit. An expected instantaneous raw BER (EIRB) is calculated as a function of an instantaneous SIR (iSIR) derived from taking into account multiple received signals. The EIRB is then is used for estimating SIR and for estimating BLER which is particularly advantageous for systems equipped with linear multiuser detectors (MUDs). The SIR and BLER estimates can be used for implementing power control of the transmitting WTRUs or otherwise for more efficient processing of the received communication signals.

Figure 3:
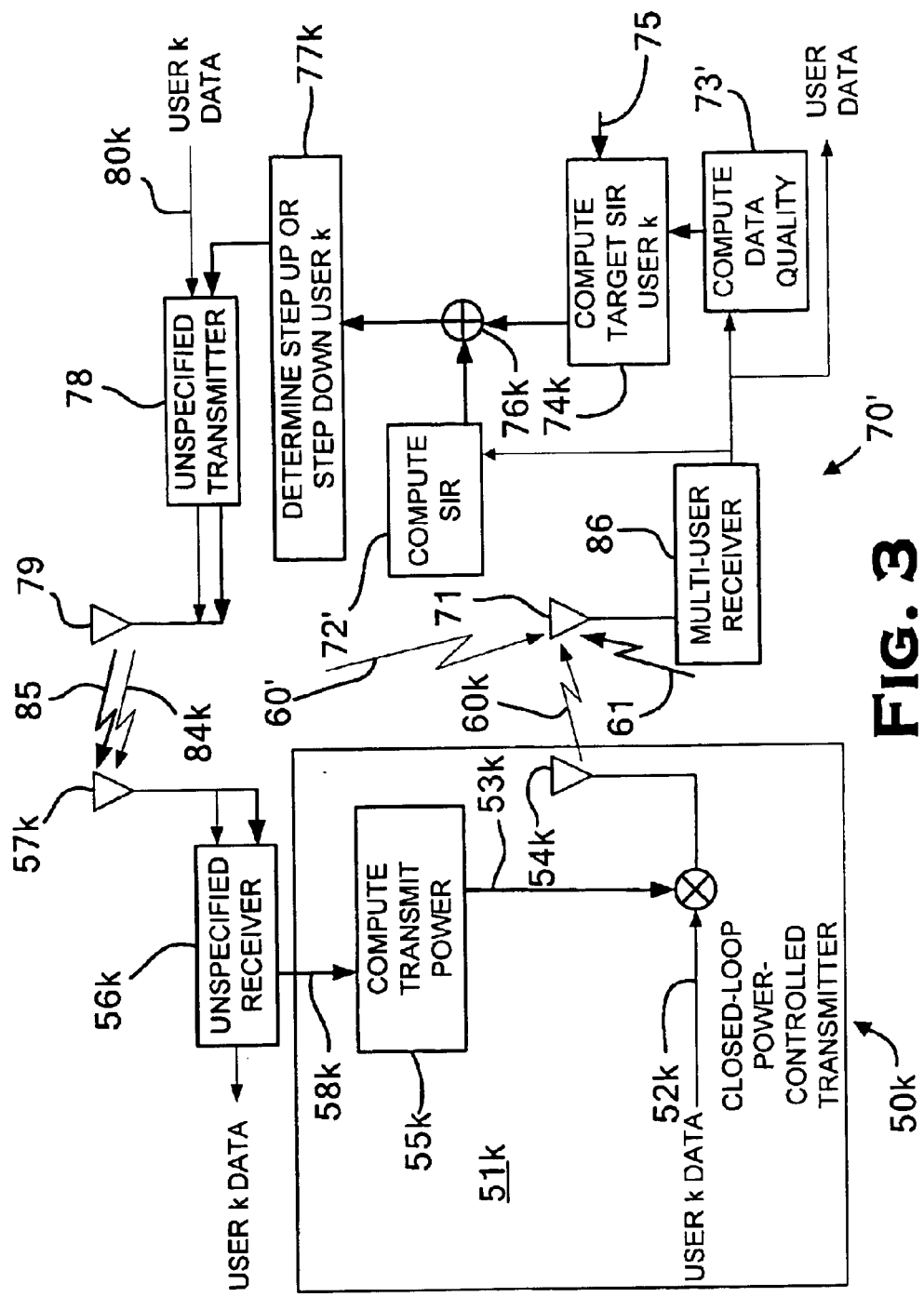
FIG. 3 is a schematic diagram of a closed loop power control system for a kth user unit in communication with receiving unit equipped with a multi-user receiver that is conducting multiple concurrent wireless communications in accordance with the teachings of the present invention.

For example, FIG. 3 illustrates closed loop power control components for one user of a multi-user wireless system where K multiple "transmitting" WTRUs (only the kth WTRU 50k shown) are concurrently communicating with one "receiving" WTRU 70' equipped with a multi-used receiver 86, such a receiver having a linear multi-user detector (MUD).

The transmitting WTRU 50k includes a transmitter 51k having a data line 52k which transports a user k data signal for transmission. The user k data signal is provided with a desired power level which is adjusted by applying a transmit power adjustment from an output 53k of a processor 55k to adjust the power level. The user data is transmitted via an antenna system 54k of the transmitter 51k.

A wireless radio signal 60k containing the transmitted data is received by the multi-user receiver 86 of the receiving WTRU 70' via a receiving antenna system 71. The receiving antenna system also receives user data signals 60' from all of the other of the K users along with other interfering radio signals 61 which impact on the quality of the received data. The receiving WTRU 70' includes an interference power computation device 72' to which the received signals are input which device 72' computes and outputs measured Signal to Interference Ratio (SIR) data calculated based on consideration of all the received user signals as set forth in more detail below. The one output shown is for a calculated SIR of the kth received signal 60k (SIRk) as used for power control of the transmitting WTRU 50k. Preferably, additional outputs are provided for SIRi, for i=1 to K, not including k, for the power control of each of the other of the plurality of K transmitting WTRUs as well as SIR outputs as desired for the processing of the user data signals in the receiving WTRU 70'.

The receiving WTRU 70' also includes a data quality computation device 73' into which the received signals are also input which device 73' produces data quality signals, preferably based upon Block Error Rate (BLER) estimates. The data quality computation device 73' preferably computes and outputs BLER estimates calculated based on consideration of all the received user signals as set forth in more detail below. The one output shown is for a BLER estimate of the kth received signal 60k (BLERk) as used for power control of the transmitting WTRU 50k. Preferably, additional outputs are provided for BLERi estimates, for i=1 to K, not including k, for the power control of each of the other of the plurality of K transmitting WTRUs as well as BLER estimates as desired for the processing of the user data signals in the receiving WTRU 70'.

A processor 74k receives the kth signal quality data, preferably BLERk, and computes target signal to interference ratio (Target SIRk) data for the kth signal based upon a user defined quality standard parameter received through an input 75.

A combiner 76k, preferably a substracter, compares the computed SIRk data from the device 72' with the computed target SIRk data from the processor 74k, preferably by subtracting, to output an SIRk error signal. The SIRk error signal from the combiner 76k is input to processing circuitry 77k which generates step up/down commands based thereon for the transmitting WTRU 50k.

The receiving station 70' also includes a transmitter 78 which is coupled with the processing circuitry 77k. The receiving station's transmitter 78 also includes an input 80k for user k data. The receiving station 70' transmits its user k data 84k and the control related data 85k for the transmitting WTRU 50k via an associate antenna system 79. The receiving station 70' preferably also transmits user data and control related data for the other transmitting WTRUs via the associate antenna system 79. The signals for each WTRU are uniquely encoded.

The transmitting station 50k includes a receiver 56k and an associated receiving antenna system 57k. The transmitting station's receiver 56k receives the radio signal transmitted from the receiving station 70' which includes the receiving station's user data 84k and the control data 85k generated by the receiving station which it identifies as intended for the WTRU 50k by its unique encoding.

The transmitting station's transmitter's processor 55k has an input 58k associated with the transmitting station's receiver 51k. The processor 55k receives the up/down command signal through input 58k and computes the transmit power adjustments based thereon.

With respect to the so-called inner loop of the closed loop power control system, the transmitting station's transmitter

51k sets its power based upon high-rate "step-up" and "step-down" commands generated by the remote receiving station 70'. At the remote receiving station 70', the SIRk of the received data is computed by the computation device 72' and compared with a target SIRk value generated by the processor 74k via combiner 76k. The target SIRk is that value (in theory) which, given that the data is received with that value, results in a desired quality of service. If the computed received SIRk is less than the target SIRk, a "step-down" command is issued by the processing circuitry 77k, via the receiving station's transmitter 78 and the transmitting station's receiver 56k, to the transmitter 51k, otherwise a "step-up" command is issued.

With respect to the so-called outer loop of the closed loop power control system, the quality of the received data is evaluated in the receiving station 70' by the computing device 73'. When enough data has been accumulated in the remote receiver to evaluate the metric, preferably BLERk, it is computed and compared with the desired metric (representing a desired quality of service) by the processor 74k and an updated target SIRk is then output. The updated target SIRk is that value (in theory) which applied in the receiver algorithm would cause the computed metric to converge to the desired value. The updated target SIRk is then used in the inner loop to determine the direction of the step up/down commands sent to the transmitting station's power scale generating processor 55k to control the power of the transmitter 51k.

In accordance with the present invention, metrics such as SIRk and BLERk are computed based on the evaluation of all K received user signals which can then be used for power control of a kth transmit user signal and also for the efficient processing of the received signals in the receiving WTRU as explained above. The novel computations were validated through testing and system modeling with respect to two commonly used linear MUDs: the zero-forcing MUD and the minimum mean square error (MMSE) MUD.

The following example for a UMTS WCDMA TDD receiver provide a non-limiting detailed illustration of an implementation of the invention. In general, the invention is to any other wireless system that employs WTRU having multi-user receivers where blocks of user data are transmitted to implement wireless communications.

Basic terms for the example UMTS WCDMA TDD receiver are preferably defined as follows:

K=Number of users/codes that are active in the system (the use of term "user" is common when referring to individual codes/signature sequences).

$N_c$=Number of chips in a data block. The number of chips is preferably used because with varying spreading factors this is a measure common to all the users. It is assumed that the number of chips is divisible by the largest SF allowed. Note that for the case of synchronous CDMA the largest symbol (from the user with the largest spreading factor) can be taken to be a block of data. In this case $N_c$ can be reduced to be equal to the largest spreading factor. (The definition of data block may vary from case to case, for the present 3GPP TDD mode example each time slot contains two data blocks.)

W=Channel Impulse Response length (in chips).

$Q^{(k)}$=Spreading factor of user k. It is assumed that the system knows these quantities in advance and does not need to estimate them from the received data.

$N_S^{(k)}$=Number of symbols sent by user k. $N_S^{(k)}=N_c/Q^{(k)}$ $N_S^T$=Total number of symbols sent=$\Sigma N_S^{(k)}$ The data sent within any given block is designated by a vector d, where $d=(d^{(1)T}, d^{(2)T}, \ldots, d^{(K)T})^T$ and $d^{(k)}$ is the data sent by the $k^{th}$ user. The dimensions of the vectors $d^{(k)}$ are equal to $N_S^{(k)}$ and may be different for each k since each $d^{(k)}$ contains all the symbols sent by each user. The spreading factor is implicit in the size of $d^{(k)}$ since the number of symbols a user can transmit within a slot depends on the spreading factor.

A chip-rate discrete-time channel model is assumed. A signal is therefore transmitted as soon as it is spread/scrambled. The signal transmitted by the $k^{th}$ user, denoted $x^{(k)}$, is:

$$x_i^{(k)} = \sum_{n=1}^{N_S^{(k)}} d_n^{(k)} v_i^{(k,n)}$$

Equation (1)

where $v^{(k,n)}$ is the signature sequence of the $k^{th}$ user's $n^{th}$ symbol. The index i indexes chips in the data block and therefore goes from 1 to $N_c$. The signature sequence is defined to be equal to a section of some longer sequence within the boundaries of a symbol, i.e. $v_i^{(k,n)}=v_i^{(k)}$ for $(n-1)Q^{(k)}+1 \leq i \leq nQ^{(k)}$, and 0 elsewhere (outside the boundaries of a symbol). The sequence $v^{(k)}$ is not, in general, assumed to be periodic, although it may be periodic in practice.

The matrix form of Equation (1) is then:

$$x^{(k)} = V^{(k)} d^{(k)}$$

Equation (2)

Here $V^{(k)}$ is called the spreading matrix for user k and has $N_S^{(k)}$ columns and $N_c$ rows. The $n^{th}$ column of $V^{(k)}$ is equal to $v^{(k,n)}$.

The signal $x^{(k)}$ is sent through a channel with impulse response $w^{(k)}$. It is assumed that the impulse response is limited in its duration to W chips. To avoid cluttering the mathematics, the noise introduced by the channel is ignored and thus the noise component is not shown anywhere. Then the received signal component from user k can be written as:

$$r_i^{(k)} = \sum_{j=1}^{W} w_j^{(k)} x_{i-j+1}^{(k)}$$

$$= \sum_{j=1}^{W} w_j^{(k)} \sum_{n=1}^{N_S^{(k)}} d_n^{(k)} v_{i-j+1}^{(k,n)}$$

$$= \sum_{n=1}^{N_S^{(k)}} d_n^{(k)} \sum_{j=1}^{W} w_j^{(k)} v_{i-j+1}^{(k,n)}$$

Equation (3)

where i ranges from 0 to Nc+W−1, j ranges from 1 to W and $x_{i-j+1}^{(k)}$ and $v_{i-j+1}^{(k)}$ are taken to be 0 whenever i−j+1 is outside the range $[1, N_c]$.

Re-writing Equation (3) in matrix form results in:

$$r^{(k)} = W^{(k)} V^{(k)} d^{(k)}$$

Equation (4)

The matrix $W^{(k)}$ is called the channel response matrix for user k and has $N_c$ columns and $(N_c+W-1)$ rows. With reference to FIG. 3, this represents the reception of signal 60k by the multi-user receiver 86 of receiving WTRU 70. The support of the $i^{th}$ column of $W^{(k)}$ is the channel impulse response $w^{(k)}$ (i.e. the $j^{th}$ element of the support is equal to $w_j^{(k)}$). The first element of the support of the $i^{th}$ column of $W^{(k)}$ is the $i^{th}$ element of the column. Accordingly, $W_{ij}^{(k)} = w_{j-i+1}^{(k)}$ if $1 \leq j-i+1 \leq W$ and 0 otherwise.

The total received user signal, i.e. the signal 60k from WTRU 50k and the signals 60' from all of the other active users, is represented by the equation:

$$r = \sum_{k=1}^{K} r^{(k)} = Ad \qquad \text{Equation (5)}$$

where the matrix A is the system transmission matrix defined as $A=[A^{(1)},A^{(2)}\ldots,A^{(K)}]$. The matrix $A^{(k)}$ is called system transmission matrix for user k with $A^{(k)}=W^{(k)}V^{(k)}$.

In this example, a matched filter is operation is defined as follows:

$$y=A^H r \qquad \text{Equation (6)}$$

and a channel cross-correlation matrix is defined as:

$$H=A^H A \qquad \text{Equation (7)}$$

While in some systems the computation of a channel cross-correlation matrix H may require a considerable use of resources, these operations are necessary for most linear multi-user detector (MUD) receivers and therefore this matrix is available for QoS estimation at no additional cost.

An instantaneous SIR can be defined for each channel k in terms of the channel cross-correlation matrix which is computed based upon the characteristics of all of the signals received by the K active users. The instantaneous SIRk (iSIRk) is defined as the SIRk for the reception of a single block of data corresponding to a single application of the MUD operation. This quantity corresponds to the SIRk that the link would be delivering had the kth channel been frozen in the particular realization that it assumed during the transmission of the given block. Since the channel varies, iSIRk will vary with the channel. It is of interest to evaluate the "average" SIRk, but as explained below, this cannot be done simply by averaging the iSIRk values.

Examples of computing iSIRk for common linear MUDs, such zero-forcing block-linear equalizer (ZF-BLE) and minimum-mean-square-error block linear equalizer (MMSE-BLE) MUDs are as follows.

The ZF-BLE MUD is defined by $$d_{ZF\text{-}BLE} = H^{-1} y \qquad \text{Equation (8)}$$

and the MMSE-BLE MUD is defined by $$d_{MMSE\text{-}BLE} = (H+\sigma^2 I)^{-1} y \qquad \text{Equation (9)}$$

where $\sigma^2$ is the variance of the channel noise as observed at the input to the receiver.

The iSIRk for the ZF-BLE and the MMSE-BLE receivers is then given by Equations (10) and (11) respectively.

$$iSIRk_{ZF} = \frac{1}{\sigma^2 H_{kk}^+} \qquad \text{Equation (10)}$$

where it is noted that $H_{kk}^+$, the [k,k] element of $H^{-1}$;

$$iSIRk_{MMSE} = \frac{\left|\left[(H+\sigma^2 I)^{-1} H\right]_{kk}\right|^2}{\sigma^2 \left|\left[(H+\sigma^2 I)^{-1} H [H+\sigma^2 I]^{-1}\right]_{kk}\right| + \sum_{\substack{l=1 \\ l \neq k}}^{K} \left|\left[(H+\sigma^2 I)^{-1} H\right]_{kl}\right|^2} \qquad \text{Equation (11)}$$

In considering the complexity of implementing Equations (10) and (11), it is noted that the iSIRk for the ZF-BLE is very low complexity. Also, the inverse of H is computed (explicitly or implicitly) to perform the multi-user detection and therefore the necessary the computation of iSIRk requires only 1 multiplications and one inverse operation. The iSIRk for MMSE-BLE is considerably more complex to compute. Again, the inverse of $H+\sigma^2 I$ is typically available from the receiver, thus eliminating the most complex step in the process. For high signal to noise ratios, the MMSE-BLE receiver performs very similarly to the ZF-BLE; thus the simple iSIRk formula for the ZF-BLE in Equation (10) can be used as an approximation to (11) for the MMSE-BLE MUD.

The iSIRk value as derived above has significance primarily as a stand-in for an average raw (decoded) Bit Error Rate (BER). Accordingly, to obtain an average of iSIR over multiple measurements, it is necessary to average the raw BER results. An expected instantaneous raw BER for a channel k (EIRBk) is defined as the raw BER that would have been observed had the channel been frozen in a realization with a given value of iSIRk. Thus, EIRBk is a function of iSIRk defined by $$EIRB = \tilde{Q}(iSIR) \qquad \text{Equation (12)}$$

where $\tilde{Q}$ is defined via the standard function Q as $$\tilde{Q}(x) = Q(\sqrt{x}) \qquad \text{Equation (13)}$$

For completeness, it is noted that the standard Q function can be expressed as:

$$Q(x) = \int_x^\infty \frac{1}{\sqrt{2\pi}} e^{-\frac{x^2}{2}} dx \qquad \text{Equation (14)}$$

The average raw BER for a channel (raw BERk) is then obtained by averaging over the EIRBk values thus obtained. The averaging is typically performed, for example, in one or more of the following ways:

over multiple receive blocks, or over multiple physical channels used to support the same link, provided that the channels are configured such that the same average SIR is desired on each channel.

The former particularly takes advantage of the fact that while link quality estimation rate is generally too high to obtain BLER estimates directly, it is nevertheless much slower than the channel variation rate, thus allowing effective averaging of the SIR/raw BER. The latter is advantageously used to average multiple iSIRks for a single link. For example, if three physical channels were transmitted by WTRU 50k to WTRU 70, signal 60k would actually contain three channel signals, each one of the K total signals, which can be denoted as $60k_1$, $60k_2$ and $60k_3$, and three iSIRk values $iSIRk_1$, $iSIRk_2$ and $iSIRk_3$ could be averaged using EIRB averaging to produce the SIR values to be used for each of the three channels transmitted by WTRU 50k. In such case, raw $BERk_1$=raw $BERk_2$=raw $BERk_3$=(EIRBk$_1$+EIRBK$_2$+EIRBk$_3$)/3.

Once the average raw BERk has been obtained, the SIRk is preferably obtained by reversing Equation (12) as follows:

$$SIRk = \tilde{Q}^{-1}(\text{raw}BERk) \qquad \text{Equation (15)}$$

In summary, the SIR estimation for a channel can be performed as follows:

For each data block compute iSIR using either (10) or (11) as appropriate.

From each iSIR value compute EIRB, preferably a relatively small look-up table is used to provide a highly efficient implementation of $\tilde{Q}$ for this step.

Average EIRB value as desired to obtain the average raw BER estimate.

Obtain the SIR estimate, preferably a relatively small look-up table is also used for implementation of $\tilde{Q}^{-1}$. This procedure has low complexity and is preferably implemented in the measuring device 73 to provide SIR data for power control as shown in FIG. 3 as well as for other processing of the received signals.

The computation of EIRB values can also be used as a link quality indication for, for example, computing BLER estimates. To compute a BLER estimate, the EIRB values which are computed from iSIR values per Equation (12) are preferably used. Through simulations and observation it has been determined that for a sufficiently high BER, the probability density of BER provides a good approximation of BLER at a given point in time as represented by:

$$iBLER \approx Pr(EIRB > CRB) \qquad \text{Equation (16)}$$

where CRB ("critical raw BER"); the probability distribution according to which the probability is computed is preferably determined as set forth below; and iBLER denotes an "instantaneous" BLER estimate. The actual BLER estimate is then obtained by averaging over a sufficiently small number of blocks. The probability distribution of the EIRB depends only on the channel conditions (multipath characteristics and the rate at which the channel varies). While these cannot be predicted, the variation is typically very smooth and the cumulative density functions for some representative distributions can be stored either via simple parametric specifications or directly. It is not required to compute a very good estimate of the cumulative density functions, since only a single value of the function is required by Equation (16).

The value of CRB depends only on the channel code used and the puncturing scheme applied to it. While a typical system may utilize several code/puncturing combinations, the number is typically small and the configurations are predetermined during system specification. Thus, for each channel code and puncturing scheme combination the appropriate value of CRB can be computed during design time and stored in a look-up table.

Figure 4:
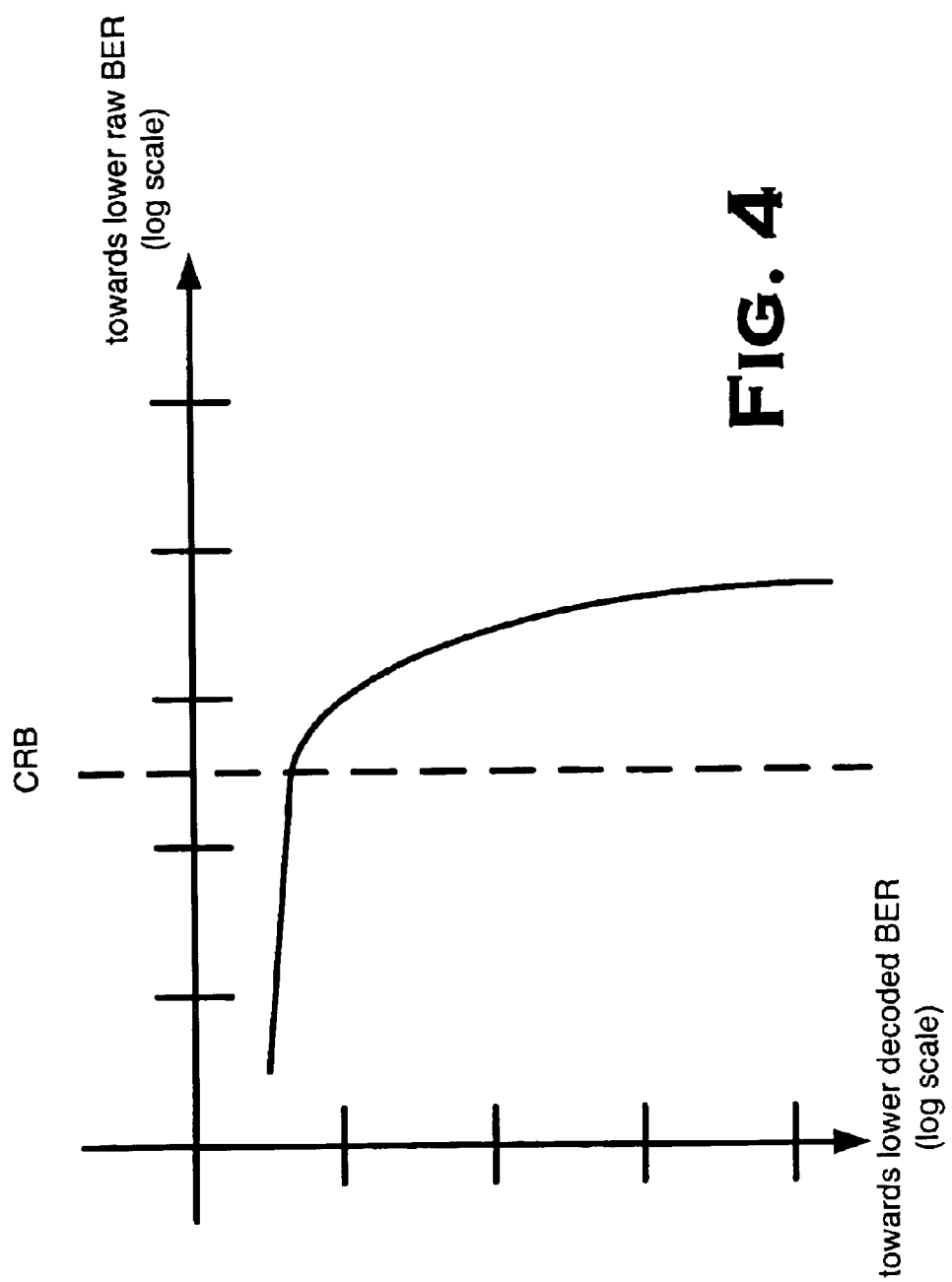
FIG. 4 is an illustration of the determination of a Critical Raw BER (CRB) from the raw BER versus decoded BER relationship in a static channel frequency division duplex (FDD).

For example, in a static (Gaussian with ISI) channel utilizing a relatively good channel code, the relationship between the raw BER (at the input to the encoder) and the decoded BER (at the output of the decoder) is, to a rough approximation a "thresholding" one. That is, until a certain "critical BER" is reached, the decoder performs extremely poorly, in fact the decoded BER is often worse than the raw BER; however, once the "critical raw BER" point is reached, the decoded BER improves extremely rapidly for very small improvements in raw BER. Thus, if the relationship between raw BER and decoded BER for a static channel is plotted, it typically appears as shown in FIG. 4 where both axes are on a log scale and CRB is preferably set at a value that approximates the point after which significant degradation occurs as illustrated.

Although the above static channel consideration does not necessarily hold for fading channels, this property of good channel decoders does has a significant effect on the resulting BLER. For example, consider a block of data which is transmitted contiguously and that is shorter than the coherence time of the channel so that the channel remains approximately static for the duration of the transmission time of each block. In the case of the fading channel, this becomes a transfer function between IERB and the instantaneous expected decoded BER (IEDB), which is defined similarly to the IERB—i.e., if the given channel realization is frozen, then this is the decoded BER that can be observed.

Given the shape of a decoder's IERB-to-IEDB transfer function it can be said with a fair degree of certainty that a block error will occur if the IERB for the given channel realization is sufficiently higher than the CRB. Similarly, it can be said with relative certainty that a block error will not occur if the IERB for the given channel realization is sufficiently lower than the CRB. If the IERB is close to the CRB, not much can be said without looking at the specific channel noise realization (i.e. actually running the decoder). Since the distribution of the IERB is a continuous function and typical BLER of interest are on the order of 0.1 or lower (as opposed to close to 0.5), it can be assumed that the probability of IERB being "too close" to the CRB is low. Thus resulting in the approximation reflected in Equation (16).

Using the approximation of Equation (16), the BLER can be evaluated by as follows:

1. For the decoder (and puncturing scheme) of interest determine the CRB
2. For given fading channel, system scenario (i.e. codes used, relative powers, etc.), $^{Ior}/_{Ioc}$ ratio and a receiver of interest determine $p_b(b)$)—the Probability Distribution Function of IERB.
3. Evaluate $$\int_0^{CRB} p_b(b) db \qquad \text{Equation (17)}$$

to obtain the BLER estimate.

Although estimation of the probability law of the IERB can be difficult, an exact probability law is not required. Equation (17) is quite robust to variations in the probability law because only a single point of the cumulative distribution function is required. Thus, to implement this function, one can classify the wireless channels according to frequency-diversity (amount of multipath) and fading speed (slow fading/fast fading). Each category can have a very small number (2–4) classifications. For each category the cumulative distribution function (i.e. Equation (17)) can be predetermined as a function of CRB as is explicit in Equation (17) and Ior/Ioc ratio as is implicit in Equation (17)) via the dependence of p(b) that ratio. The determination of the channel law is then reduced to establishing the frequency-diversity (amount of multipath) and fading speed of the channel as well as Ior/Ioc ratio that are readily performed using standard well known methods.

The BLER estimate is made for each channel k. If a particular radio link is comprised of more then one channel, the overall BLER is preferably calculated as the weighted average of all the individual channel BLERs of the radio link. The weighting depends on the block rate per channel. For example, a radio link could have a first channel $k_1$ that carries two blocks per second with BLER x as calculated in accordance with Equation (17) and a second channel $k_2$ that carries one block per second with BLER y as calculated in accordance with Equation (17). Then, when computing BLER, the fact that channel $k_1$ has twice as many blocks as channel $k_2$ is preferably taken into account, thus the average BLER which is used for both channels is:

$$(2x+1y)/(2+1)=(2x+y)/3=BLER_{k_1}=BLER_{k_2}. \qquad \text{Equation (18)}$$

This process is extremely fast when implemented. Since decoder performance for 3GPP systems depends on puncturing and repetition, a table is preferably made for CRBs for various puncturing/repetition levels. If one assumes that it is desirable to go from repetition by a factor of 2 (100%) to puncturing by 50% in 10% increments, this results in 15 points per code for a total of 45 points. The operation in Equation (16) is accordingly a fairly low complexity operation performed in the quality data computational component 73'.

Preferably, the compute SIR component 72' and compute data quality component 73' of the receiving WTRU 70' of FIG. 3 are implemented on an single integrated circuit, such as an application specific integrated circuit (ASIC) which may also include the multi-user receive 86 and the various power control components of the WTRU 70'. However, the components may also be readily implemented on multiple separate integrated circuits. They may also be implemented in software that runs on a digital signal processor (DSP).

The foregoing description makes references to a 3GPP w-CDMA TDD system WTRU equipped with a linear MUD as an example only and not as a limitation. The invention is applicable to other systems of wireless communication including WTRUs equipped with multi-user receivers. Other variations and modifications consistent with the invention will be recognized by those of ordinary skill in the art.

What is claimed is:

1. A receiving wireless transmit receive unit (WTRU) for processing concurrent communication signals from a plurality of transmitting WTRUs that concurrently transmit successive data blocks in a plurality of K forward channels, the receiving WTRU comprising:
   a receiver configured to receive successive data blocks of K concurrent transmissions transmitted from the transmitting WTRUs on the respective K forward channels;
   a processor configured to compute individual channel characteristics for each forward channel k based on the characteristics of data signals received on all K forward channel; and
   said processor configured to successively compute instantaneous Signal to Interference Ratio values for each forward channel j (iSIRj), for integers j=1 to K, based on a cross correlation matrix of channel response characteristics of K concurrently received data blocks and to selectively compute an average value that is used for the computing the individual channel characteristics for the forward channel k.

2. The invention of claim 1 where the transmitting WTRUs are configured to make forward channel power adjustments as a function of characteristics of the data signals as received over the respective forward channel in which closed loop transmission power control for the forward channel k is implemented wherein the receiving WTRU is configured to compute transmit power control signals by producing power step commands as a function of computed Target Signal to Interference Ratios for the forward channel k (Target SIRks) in comparison to a signal characteristic SIRk value wherein said processor is configured to compute the signal characteristic SIRk values as a selectively defined average value of iSIRj values.

3. The invention of claim 2 where each Target SIR is determined as a function of a Block Error Rate estimate for the forward channel k (BLERk estimate) wherein said processor is configured to compute the BLERk estimate as a selectively defined average value of iSIRj values.

4. The invention of claim 3 further comprising a transmitter configured to transmit on a reverse channel the transmit power control signals for forward channel power adjustments of forward channel k.

5. The invention of claim 1 wherein said processor is configured to compute a signal characteristic SIRk value as a selectively defined average value of iSIRj values as the individual channel characteristic for the forward channel for the processing of the data blocks received on the forward channel.

6. The invention of claim 1 wherein said processor is configured to compute a Block Error Rate estimate for the forward channel k (BLERk estimate) as a selectively defined average value of iSIRj values as the individual channel characteristic for the forward channel for the processing of the data blocks received on the forward channel.

7. The invention of claim 1 wherein said processor is configured to compute the average value that is used for the computing the individual channel characteristics for each forward channel k by computing an expected instantaneous raw Bit Error Rate (BER) for the channel k (EIRBk) as a function of iSIRk defined by $$EIRBk = \tilde{Q}(iSIRk)$$

where $\tilde{Q}(x) = Q(\sqrt{x})$ and $$Q(x) = \int_x^\infty \frac{1}{\sqrt{2\pi}} e^{-\frac{x^2}{2}} dx,$$

and then computing an average of selected EIRBk values to define a raw Bit Error Rate for the channel k (raw BERk).

8. A receiving wireless transmit receive unit (WTRU) for implementing transmission power control for a plurality of transmitting WTRUs that concurrently transmit successive data blocks in a plurality of K forward channels where the transmitting WTRUs are configured to make forward channel power adjustments as a function of characteristics of the data signals as received over the respective forward channel, the receiving WTRU comprising:
   a receiver configured to receive successive data blocks of K concurrent transmissions transmitted from the transmitting WTRUs on the respective K forward channels;
   a processor configured to compute transmit power control signals for a forward channel k based on the characteristics of data signals received on all K forward channel; and
   said processor configured to successively compute instantaneous Signal to Interference Ratio values for each forward channel j (iSIRj), for integers j=1 to K, based on a cross correlation matrix of channel response characteristics of K concurrently received data blocks and to selectively compute an average value that is used for the computing transmit power control signals for the forward channel k.

9. The invention of claim 8 in which closed loop transmission power control for the forward channel k is implemented wherein the receiving WTRU is configured to compute the transmit power control signals by producing power step commands as a function of computed Target Signal to Interference Ratios for the forward channel k (Target SIRks) in comparison to a signal characteristic SIRk value wherein said processor is configured to compute the signal characteristic SIRk values as a selectively defined average value of iSIRj values.

10. The invention of claim 9 where each Target SIR is determined as a function of a Block Error Rate estimate for the forward channel k (BLERk estimate) wherein said processor is configured to compute the BLERk estimate as a selectively defined average value of iSIRj values.

11. The invention of claim 10 further comprising a transmitter configured to transmit on a reverse channel the transmit power control signals for forward channel power adjustments of forward channel k.

12. The invention of claim 8 in which closed loop transmission power control for the forward channel k is implemented wherein the receiving WTRU is configured to compute the transmit power control signals by producing power step commands as a function of computed Target Signal to Interference Ratios for the forward channel k (Target SIRks) where each Target SIR is determined as a function of a Block Error Rate estimate for the forward channel k (BLERk estimate) wherein said processor is configured to compute the BLERk estimate as a selectively defined average value of iSIRj values.

13. The invention of claim 8 further comprising a transmitter configured to transmit on a reverse channel the transmit power control signals for forward channel power adjustments of forward channel k.

14. The invention of claim 8 wherein said processor is configured to compute the average value that is used for the computing the individual channel characteristics for each forward channel k by computing an expected instantaneous raw Bit Error Rate (BER) for the channel k (EIRBk) as a function of iSIRk defined by $$EIRBk = \tilde{Q}(iSIRk)$$

where $\tilde{Q}(x) = Q(\sqrt{x})$ and $$Q(x) = \int_x^\infty \frac{1}{\sqrt{2\pi}} e^{-\frac{x^2}{2}} dx,$$

and then computing an average of selected EIRBk values to define a raw Bit Error Rate for the channel k (raw BERk).

15. A method for a receiving wireless transmit receive unit (WTRU) for processing concurrent communication signals from a plurality of transmitting WTRUs that concurrently transmit successive data blocks in a plurality of K forward channels, the receiving WTRU comprising:

receiving successive data blocks of K concurrent transmissions transmitted from the transmitting WTRUs on the respective K forward channels;

computing individual channel characteristics for each forward channel k based on the characteristics of data signals received on all K forward channel by successively computing instantaneous Signal to Interference Ratio values for each forward channel j (iSIRj), for integers j=1 to K, based on a cross correlation matrix of channel response characteristics of K concurrently received data blocks and then selectively computing an average value that is used for the computing the individual channel characteristics for the forward channel k.

16. The method of claim 15 where the transmitting WTRUs are configured to make forward channel power adjustments as a function of characteristics of the data signals as received over the respective forward channel in which closed loop transmission power control for the forward channel k is implemented, further comprising computing transmit power control signals by producing power step commands as a function of computed Target Signal to Interference Ratios for the forward channel k (Target SIRks) in comparison to a signal characteristic SIRk value wherein the signal characteristic SIRk values is computed as a selectively defined average value of iSIRj values.

17. The method of claim 16 where each Target SIR is determined as a function of a Block Error Rate estimate for the forward channel k (BLERk estimate) wherein the BLERk estimate is computed as a selectively defined average value of iSIRj values.

18. The method of claim 17 further comprising transmitting on a reverse channel the transmit power control signals for forward channel power adjustments of forward channel k.

19. The method of claim 15 wherein a signal characteristic SIRk value is computed as a selectively defined average value of iSIRj values as the individual channel characteristic for each forward channel and is used for the processing of the data blocks received on the respective forward channel.

20. The method of claim 19 wherein a Block Error Rate estimate is computed for each forward channel k (BLERk estimate)as a selectively defined average value of iSIRj values as the individual channel characteristic for each forward channel and is used for the processing of the data blocks received on the respective forward channel.

21. The method of claim 15 wherein the average value that is used for the computing the individual channel characteristics for each forward channel k is computed by computing an expected instantaneous raw Bit Error Rate (BER) for the channel k (EIRBk) as a function of iSIRk defined by $$EIRBk = \tilde{Q}(iSIRk)$$

where $\tilde{Q}(x) = Q(\sqrt{x})$ and $$Q(x) = \int_x^\infty \frac{1}{\sqrt{2\pi}} e^{-\frac{x^2}{2}} dx,$$

and then computing an average of selected EIRBk values to define a raw Bit Error Rate for the channel k (raw BERk).

* * * * *

UNITED STATES PATENT AND TRADEMARK OFFICE
CERTIFICATE OF CORRECTION

PATENT NO.   : 6,879,813 B2
DATED        : April 12, 2005
INVENTOR(S)  : Alexander Reznik It is certified that error appears in the above-identified patent and that said Letters Patent is hereby corrected as shown below:

Title page,
Item [56], References Cited, U.S PATENT DOCUMENTS, delete "5,812,593 A * 9/1998 Kaku" and insert therefor
-- 5,812,938 A * 9/1998 Gilhousen et al. --.

Column 2,
Line 58, after the word "An", delete "examples" and insert therefor -- example --.

Column 10,
Line 64, before the word "if", delete "$w_{j-i+1}^{(k)}$" and insert therefor -- $w^{(k)}_{j-i+1}$ --.

Column 12,
Line 55, before the word "+EIRBk$_3$", delete "EIRBK$_2$" and insert therefor -- EIRBk$_2$ --.

Column 15,
Line 34, delete "channel" and insert therefor -- channels --.

Column 16,
Line 40, delete "channel" and insert therefor -- channels --.

Column 17,
Line 41, after the words "K forward", delete "channel" and insert therefor -- channels --.

Signed and Sealed this

Ninth Day of August, 2005

JON W. DUDAS
*Director of the United States Patent and Trademark Office*